July 18, 1950  L. V. MICHAL  2,515,659
AUTOMOBILE ENGINE WARMER
Filed May 6, 1949
*Fig. 2.*
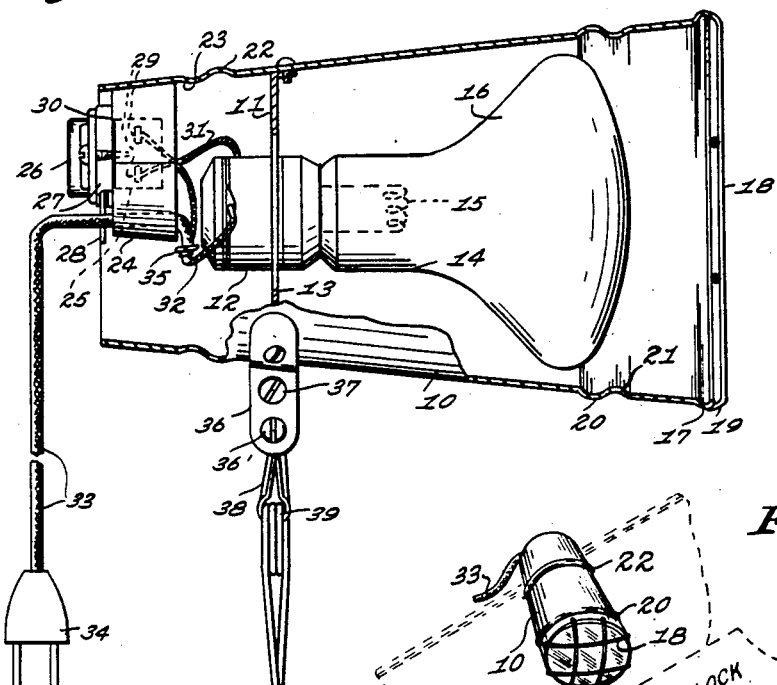
*Fig. 1.*
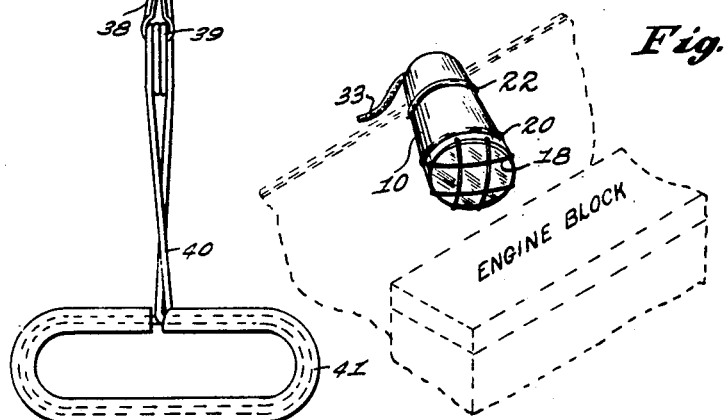
*Fig. 3.*
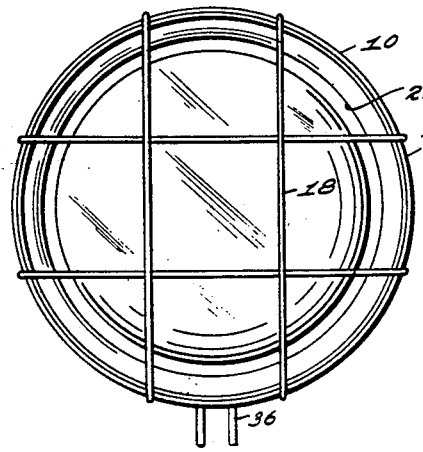
*Fig. 4.*
*Fig. 5.*
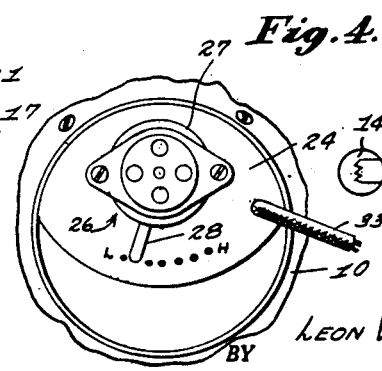
INVENTOR.
LEON V. MICHAL
BY Thomas J. McKavanagh
ATTORNEY Patented July 18, 1950

2,515,659

UNITED STATES PATENT OFFICE 2,515,659

AUTOMOBILE ENGINE WARMER

Leon V. Michal, Lincoln, Nebr.

Application May 6, 1949, Serial No. 91,778

1 Claim. (Cl. 219—34)

This invention relates to thermostatically controlled infra-red heaters adapted for use under the hood of an automobile to maintain the engine in condition for ready starting during periods of non-use of the automobile in severely cold weather.

It is an object of this invention to provide a readily portable unitary assembly for placing under the hood of an automobile and adjacent the engine of the automobile, and with the unitary assembly comprising an infra-red heater and thermostatic control means within a protective and heat reflecting and directing casing.

It is a further object of this invention to provide a light and portable unitary assembly comprising an infra-red heater of the reflecting type disposed within a protective casing and with thermostatic control means also carried by the casing and disposed cooperative therewith so that the control means are responsive to the temperature of the air immediately surrounding the casing and relatively unresponsive to direct or reflected rays from the heater.

It is a further object of this invention to provide a unitary assembly comprising a casing and a heater and its thermostatic control within the casing, together with means on the casing for readily attaching the assembly to any convenient support on, or adjacent to the engine of an automobile.

It is a further object of this invention to provide a unitary assembly comprising a casing and a heater and its thermostatic control within the casing, a power cable anchored at one end to the assembly, means on the casing for readily attaching to assembly to any convenient support on, or adjacent to the engine of an automobile, and with the attaching means disposed on the casing to mitigate the effect of an accidental pull on the power cable while the casing is attached to the convenient support in use.

Other and further objects will appear herein.

In the drawings:

Figure 1 is a diagrammatic sketch indicating the association of the warmer with the engine of an automobile.

Figure 2 is a side elevational view of the warmer, with parts broken and with parts in section.

Figure 3 is a front elevational view of the warmer, and Figure 4 is a rear elevational view.

Figure 5 is a diagrammatic showing of the electric circuit of the warmer.

As shown in Figure 1, an elongated truncated conical casing 10, substantially open at both ends, has an internal partition member 11, on which is supported a lamp socket 12. The member 11 divides the interior of the casing into a front portion and a rear portion, and the front face of the member 11 has a heat reflecting surface, indicated at 13.

A conventional type of infra-red lamp 14 is supported in the lamp socket 12, and the lamp is of a type which emits the greater part of its output as infra-red rays but also emits enough useful light rays for a purpose to be discussed later herein. The lamp includes a filament 15, and has an interior reflecting surface indicated at 16, and has a suitable diffusing surface at its front end.

A bead 17 is formed in the wall of the casing 10, and a protective wire guard 18 has resilient clips 19 which frictionally engage the bead.

Adjacent the front end of the casing the wall of the casing is corrugated at 20 to stiffen the wall of the casing, and to also provide an interior curved surface 21 which tends to reflect rays from the lamp in a forward direction. In the rear portion of the casing 10, the wall of the casing is corrugated at 22, to stiffen the wall of the casing, and to define an internal abutment 23.

At the rear end of the casing 10, there is disposed a block 24, of low heat conductivity, and suitably secured to the wall of the casing. The block is recessed to receive a portion 25 of a conventional thermostatic switch 26, of the bimetallic operator type, and the casing of the switch is suitably secured to the block 24. A rearwardly extending and exposed portion 27 of the switch 26 contains the bimetallic operator, and a manually operable lever 28, extends outwardly of the portion 27 so that the switch 26 may be adjusted to close when a certain low temperature is reached, and to open when a certain higher temperature is reached. The switch contacts proper, indicated at 29 are housed in the portion 25, and the rear and forward portions of the switch are substantially separated from each other by a partition member, indicated at 30, and through which a small operating rod extends. Thus the interior of the portion 25 is practically sealed against ingress of vapors to the switch contacts 29, and the portion 25 is substantially protected against damage by being housed in the block 24.

Wires 31 and 32 connect the contacts 29 to the lamp socket and to a cable 33, respectively. The cable 33 extends through the block 24, and is provided with a conventional connector 34 for connection to a power outlet. A metallic ring 35 is clamped about the cable 33 and the block 24 forms an abutment or stop to prevent the cable being pulled through the block rearwardly, and so prevent undue strain on the wires in the casing.

Suitably secured to the casing 10, is a pair of spaced opposed and upstanding support members 36, which are apertured near their free ends to provide a seat for a ball member 36'. Suitable means, such as a threaded bolt and nut assembly 37, with the bolt passing through the members 36, provide for holding the members 36 in clamping relation to the ball 36'. The ball 36' is a part connecting a pair of clamping arms 38, which clamp a coiled portion 39 connecting a pair of wire arms 40, which have their free ends bent to define a pair of spaced opposed clamping jaws 41. The free ends are covered with suitable friction surface means such as rubber tubing. The arms 40 are adapted to be squeezed together to open the jaws, so that the assembly may be clamped to a radiator rod, or some other suitable support under the hood of an automobile engine when the arms 40 are released.

When the unitary assembly is to be installed under the hood of the engine, the user may first move the lever 28 to switch on the lamp 14, so that he will have enough light to work by, and have enough heat to warm chilled fingers while he is fastening the assembly to a suitable support. When the assembly has been installed he then moves the lever 28 to its normal operating position to set the thermostatic switch for the purpose of maintaining a desired temperature of the parts to be heated, and a desired temperature of the air under the hood so the engine will start readily on a cold morning. He may also, of course, move the lever 28 to switch on the lamp to have the benefit of heat on his fingers, and yet enough light to work by in making adjustments about the engine in severely cold weather.

It will now be evident that in the unitary assembly herein described, the thermostatic switch is isolated from the direct rays of the lamp 14, and from reflected rays from reflecting parts of the engine adjacent the front end of the assembly. It is also insulated from heat by conduction from the casing 10, and it is also practically isolated from air convection currents through the casing.

The thermostatic switch will, therefore, respond only to the ambient temperature of the air under the hood, and the possibility of its "hunting" due to its being affected by reflected rays is entirely eliminated.

The unitary assembly is also applicable to tractors when a blanket or other suitable covering is thrown over the engine, and it is applicable to cars left standing outside and without the protection of a garage.

Should anyone trip over the cable 33 when the assembly is in use, the unusual pull on the cable will not disturb the connections to the lamp because the anchor ring 35 abuts the block 24, and is adapted to cooperate therewith to prevent the cable being pulled through the bore in the block. It will also be noted that the means for fastening the assembly to the radiator rod, or other suitable support under the hood, are secured to the casing well toward the rear end of the casing, so that when the assembly is in use with the front end pointing downward some of the accidental pull is taken up in turning the assembly to a horizontal position.

The internal diameter of the casing 10, adjacent the large end of the lamp is such that there is ample clearance between the lamp and the casing to guard the lamp against injury should the casing be accidentally pulled from its support under the hood.

It is obvious that the casing 10 may be made of two portions, namely, a front portion including the partition member, and a second connected rear portion housing the thermostatic switch and formed of some thermoplastic material, while retaining the feature of isolating the switch from the rays of the lamp or other heater means in the front chamber.

What is claimed is:

A unitary heating assembly adapted for use in a confined space such as under the hood of an automobile engine, said unitary assembly comprising an elongated tubular casing substantially open at both ends, an internal barrier member in said casing arranged dividing said tubular casing into front and rear portions, respectively, and arranged to provide a substantial barrier against the movement of air currents from the front to the rear portion of said tubular casing, an electric heater disposed in the front portion of said tubular casing, a casing housing a thermostatic switch assembly and having a partition member dividing said switch casing into front and rear portions, respectively, switch contact elements disposed within the front portion of said switch casing, tempertaure responsive means disposed in the rear portion of said switch casing and cooperably connected with said switch contacts, means supporting said thermostatic switch assembly arranged to substantially isolate said switch assembly from conduction and convection heat currents from said heater incident to the use of the unitary heating assembly in a confined space whereby said switch assembly is responsive only to the ambient temperature of the air in the confined space, said means comprising a block of insulating material secured to the wall of said tubular casing and in the rear portion of said tubular casing and longitudinally spaced from said barrier, said block being provided with means defining a rearwardly opening recess receiving the front portion of said switch casing in supporting and protecting relation.

LEON V. MICHAL.

REFERENCES CITED

The following references are of record in the file of this patent:

UNITED STATES PATENTS

| Number | Name | Date |
| --- | --- | --- |
| 1,058,442 | Kenyon | Apr. 8, 1913 |
| 1,622,326 | Lister | Mar. 29, 1927 |
| 1,917,141 | Middleton | July 4, 1933 |